United States Patent
Kwon et al.

(10) Patent No.: US 8,230,288 B2
(45) Date of Patent: Jul. 24, 2012

(54) DATA TRANSMISSION APPARATUS AND METHOD FOR APPLYING AN APPROPRIATE CODING RATE

(75) Inventors: Chang-Yeul Kwon, Yongin-si (KR); Ji-Sung Oh, Seongnam-si (KR); Seong-Soo Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1281 days.

(21) Appl. No.: 11/874,342

(22) Filed: Oct. 18, 2007

(65) Prior Publication Data

US 2008/0098274 A1    Apr. 24, 2008

Related U.S. Application Data

(60) Provisional application No. 60/852,416, filed on Oct. 18, 2006.

(30) Foreign Application Priority Data

Jul. 19, 2007    (KR) .................. 10-2007-0072271

(51) Int. Cl.
  *G08C 25/02* (2006.01)
(52) U.S. Cl. ........................... 714/748
(58) Field of Classification Search ............ 714/748, 714/749
  See application file for complete search history.

(56) References Cited

U.S. PATENT DOCUMENTS

| | | | | |
|---|---|---|---|---|
| 5,490,168 A * | 2/1996 | Phillips et al. | ............ | 375/224 |
| 6,697,986 B2 * | 2/2004 | Kim et al. | ............ | 714/751 |
| 6,831,908 B2 * | 12/2004 | Kikuchi | ............ | 370/338 |
| 7,024,611 B2 * | 4/2006 | Chen et al. | ............ | 714/751 |
| 7,155,655 B2 * | 12/2006 | Cheng | ............ | 714/748 |
| 7,600,173 B2 * | 10/2009 | Matsumoto | ............ | 714/755 |
| 7,813,302 B2 * | 10/2010 | Senta et al. | ............ | 370/255 |
| 7,904,779 B2 * | 3/2011 | Belogolovy et al. | ............ | 714/751 |
| 8,031,648 B2 * | 10/2011 | Ishii et al. | ............ | 370/311 |
| 2007/0115848 A1 * | 5/2007 | Chean et al. | ............ | 370/252 |
| 2009/0031183 A1 * | 1/2009 | Hoshino et al. | ............ | 714/748 |
| 2009/0067376 A1 * | 3/2009 | Ishii et al. | ............ | 370/329 |
| 2009/0217120 A1 * | 8/2009 | Sawahashi et al. | ............ | 714/750 |

* cited by examiner

*Primary Examiner* — James C Kerveros
(74) *Attorney, Agent, or Firm* — Sughrue Mion, PLLC

(57) ABSTRACT

Provided are a data transmission apparatus and method which apply an appropriate coding rate according to significance of bits or bit groups included in uncompressed data and retransmit all or part of the data when a transmission error occurs in the data while the data is being transmitted over a wireless network. The data transmission apparatus includes a mode termination unit which determines a retransmission mode for an initial transmission packet which has a transmission error; a packet generation unit which generates a retransmission packet, which includes at least part of the initial transmission packet, according to the determined retransmission mode; and a communication unit which transmits the retransmission packet through a communication channel.

26 Claims, 11 Drawing Sheets

DATA TRANSMISSION APPARATUS AND METHOD FOR APPLYING AN APPROPRIATE CODING RATE

This application claims priority from U.S. Provisional Patent Application No. 60/852,416 filed on Oct. 18, 2006 in the United States Patent and Trademark Office, and Korean Patent Application No. 10-2007-0072271 filed on Jul. 19, 2007 in the Korean Intellectual Property Office, the disclosure of which is incorporated herein by reference in its entirety.

BACKGROUND OF THE INVENTION

1. Field of the Invention

Apparatuses and methods consistent with the present invention relate to data transmission, and more particularly, to data transmission which applies an appropriate coding rate according to significance of bits or bit groups included in uncompressed data and retransmit all or part of the data when a transmission error occurs in the data while the data is being transmitted over a wireless network.

2. Description of the Related Art

As networks become wireless and the demand for large multimedia data transmission increases, there is a need for studies on an effective transmission method in a wireless network environment. In particular, the need for various home devices to wirelessly transmit high-quality videos, such as digital video disk (DVD) images or high definition television (HDTV) images, is growing.

An IEEE 802.15.3c task group is developing a technological standard for transmitting large-volume data over a wireless home network. The technological standard, which is called "millimeter wave" (mmWave), uses an electric wave having a physical wavelength of a millimeter (i.e., an electric wave having a frequency band of 30-300 GHz) to transmit large-volume data. This frequency band, which is an unlicensed band, has conventionally been used by communication service providers or used for limited purposes, such as observing electric waves or preventing vehicle collision.

FIG. 1 is a diagram comparing frequency bands of IEEE 802.11 series standards and mmWave. Referring to FIG. 1, the IEEE 802.11b or IEEE 802.11g standard uses a carrier frequency of 2.4 GHz and has a channel bandwidth of approximately 20 MHz. In addition, an IEEE 802.11a or IEEE 802.11n standard uses a carrier frequency of 5 GHz and has a channel bandwidth of approximately 20 MHz. On the other hand, mmWave uses a carrier frequency of 60 GHz and has a channel bandwidth of approximately 0.5-2.5 GHz. Therefore, it can be understood that mmWave has a far greater carrier frequency and channel bandwidth than the related art IEEE 802.11 series standards. When a high-frequency signal (a millimeter wave) having a millimeter wavelength is used, a very high transmission rate of several Gbps can be achieved. Since the size of an antenna can also be reduced to less than 1.5 mm, a single chip including the antenna can be implemented. Furthermore, interference between devices can be reduced due to a very high attenuation ratio of the high-frequency signal in the air.

In recent years, a technique for transmitting uncompressed audio or video data (hereinafter, referred to as uncompressed data) between wireless apparatuses using the millimeter wave having a large bandwidth has been studied. Compressed data is compressed with a partial loss through processes such as motion compensation, discrete cosine transform (DCT) conversion, quantization, and variable length coding, such that portions of the data insensitive to the sense of sight or the sense of hearing of human beings are eliminated. In contrast, uncompressed data includes digital values (for example, R, G, and B components) representing pixel components.

Hence, bits included in the uncompressed data have different degrees of significance while there is no difference in the significance of bits included in the compressed data. For example, referring to FIG. 2, a pixel component of an eight-bit image is represented by eight bits. Of the eight bits, a bit representing the highest order (the highest-level bit) is the most significant bit (MSB), and a bit representing the lowest order (the lowest-level bit) is the least significant bit (LSB). In other words, each of eight bits that form one-byte data has a different significance in restoring an image or audio signal.

When an error occurs in a bit having high significance during transmission, it is possible to detect the error easier than when the error occurs in a bit having low significance. Therefore, it is necessary to protect bit data having high significance such that no error occurs in the bit data during wireless transmission, as compared to bit data having low significance. A method of correcting errors of all bits to be transmitted at the same code rate, which is a related art transmission method, has been used in the IEEE 802.11 standard.

FIG. 3 is a diagram illustrating the structure of a physical (PHY) protocol data unit (PPDU) 30 of the IEEE 802.11a standard. Referring to FIG. 3, the PPDU 30 is composed of a preamble, a signal field, and a data field. The preamble, which is a signal for PHY layer synchronization and channel estimation, is composed of a plurality of short training signals and a long training signal. The signal field includes a RATE field indicating a transmission rate and a LENGTH field indicating the length of the PPDU 30. Generally, the signal field is encoded by a symbol. The data field includes a physical layer service data unit (PSDU), a tail bit, and a pad bit. Data to be transmitted is included in the PSDU.

Data recorded in the PSDU is composed of codes that are encoded using a convolution encoder. Bits that form data, such as compressed data, are not different in terms of significance. In addition, since the bits are encoded using the same error correction encoding method, an equal error correction capability is applied to each bit.

This related art data transmission method can be effective for general data transmission. However, if each portion of data to be transmitted has a different significance, it is necessary to perform more superior error correction encoding on portions of greater significance in order to reduce the probability of error occurrence.

In order to prevent error occurrence, a transmitting end performs error correction encoding on data. Even if an error occurs while the error-correction encoded data is transmitted, the error-correction encoded data can be restored as long as the error is within a correctable range. There are a variety of error correction encoding algorithms, and each error correction encoding algorithm has a different error correction capability. Even the same error correction encoding algorithm may show different performances depending on a coding rate used.

In general, as the coding rate increases, data transmission efficiency is enhanced, but error correction capability is reduced. Conversely, as the coding rate decreases, data transmission efficiency is reduced, but error correction capability is enhanced. As described above, since uncompressed data includes bits having different degrees of significance unlike compressed data, upper bits, which are more significant than lower bits, need to be better protected against errors during data transmission.

Related art methods of guaranteeing stable wireless data transmission include a method of restoring data using error correction encoding and a method of re-transmitting data having an error from a transmitting end to a receiving end.

SUMMARY OF THE INVENTION

The present invention provides a data transmission apparatus and method which apply an appropriate coding rate according to significance of bits or bit groups included in uncompressed data and retransmit all or part of the data when a transmission error occurs in the data while the data is being transmitted over a wireless network.

The present invention also provides a data transmission apparatus and method which apply different transmission speed according to the number of subpackets to be retransmitted.

According to an aspect of the present invention, there is provided a data transmission method including determining a retransmission mode for an initial transmission packet which has a transmission error; generating a retransmission packet, which comprises at least part of the initial transmission packet, according to the determined retransmission mode; and transmitting the retransmission packet through a communication channel, wherein the retransmission mode comprises at least one of: a first mode in which the retransmission packet is generated by applying a same coding rate to bits included in the at least part of the initial transmission packet which is comprised of bits coded at the same coding rate and in which the generated retransmission packet is transmitted; a second mode in which the retransmission packet is generated by applying different coding rates to the bits included in the at least part of the initial transmission packet which is comprised of the bits coded at the same coding rate and in which the generated retransmission packet is transmitted; a third mode in which the retransmission packet is generated by applying the same coding rate to the bits included in the at least part of the initial transmission packet which is comprised of the bits coded at different coding rates and in which the generated retransmission packet is transmitted; and a fourth mode in which the retransmission packet is generated by applying different coding rates to the bits included in the at least part of the initial transmission packet which is comprised of the bits coded at different coding rates and in which the generated retransmission packet is transmitted.

According to another aspect of the present invention, there is provided a data transmission method including determining a retransmission mode for an initial transmission packet which has a transmission error; generating a retransmission packet, which comprises at least part of the initial transmission packet, according to the determined retransmission mode; and transmitting the retransmission packet through a communication channel, wherein a transmission duration of the initial transmission packet is equal to a transmission duration of the retransmission packet.

According to another aspect of the present invention, there is provided a data transmission method including determining a retransmission mode for an initial transmission packet which has a transmission error; generating a retransmission packet, which comprises at least part of the initial transmission packet, according to the determined retransmission mode; and transmitting the retransmission packet through a communication channel, wherein a transmission duration of the retransmission packet varies according to a number of subpackets included in the retransmission packet.

According to another aspect of the present invention, there is provided a data transmission apparatus including a mode termination unit which determines a retransmission mode for an initial transmission packet which has a transmission error; a packet generation unit which generates a retransmission packet, which comprises at least part of the initial transmission packet, according to the retransmission mode determined by the mode termination unit; and a communication unit which transmits the retransmission packet through a communication channel, wherein the retransmission mode comprises at least one of: a first mode in which the retransmission packet is generated by applying a same coding rate to bits included in the at least part of the initial transmission packet which is comprised of bits coded at the same coding rate and in which the generated retransmission packet is transmitted; a second mode in which the retransmission packet is generated by applying different coding rates to the bits included in the at least part of the initial transmission packet which is comprised of the bits coded at the same coding rate and in which the generated retransmission packet is transmitted; a third mode in which the retransmission packet is generated by applying the same coding rate to the bits included in the at least part of the initial transmission packet which is comprised of the bits coded at different coding rates and in which the generated retransmission packet is transmitted; and a fourth mode in which the retransmission packet is generated by applying different coding rates to the bits included in the at least part of the initial transmission packet which is comprised of the bits coded at different coding rates and in which the generated retransmission packet is transmitted.

According to another aspect of the present invention, there is provided a data transmission apparatus including a mode termination unit which determines a retransmission mode for an initial transmission packet which has a transmission error; a packet generation unit which generates a retransmission packet, which comprises at least part of the initial transmission packet, according to the retransmission mode determined by the mode termination unit; and a communication unit which transmits the retransmission packet through a communication channel, wherein a transmission duration of the retransmission packet varies according to a number of subpackets included in the retransmission packet.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS OF THE INVENTION

Figure 1:
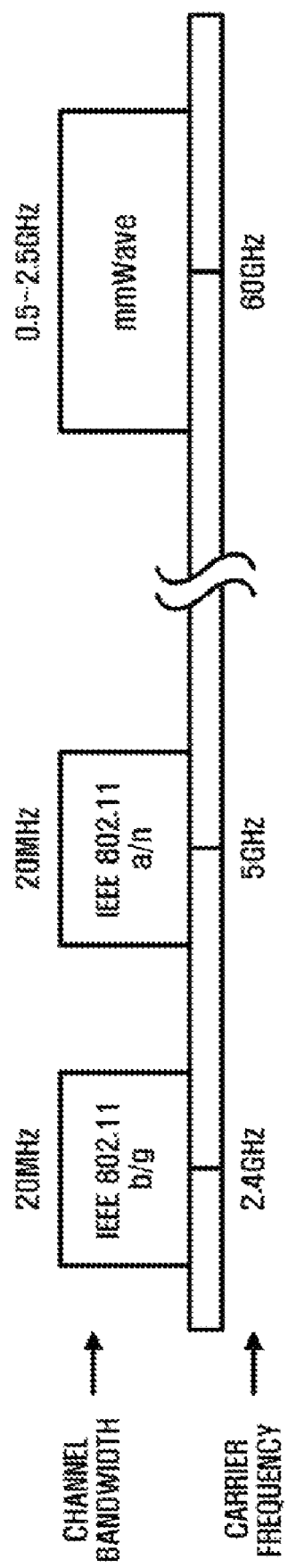
FIG. 1 is a diagram comparing frequency bands of the IEEE 802.11 series standards and mmwave.

The present invention will now be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art. Like reference numerals in the drawings denote like elements, and thus their description will be omitted.

Hereinafter, exemplary embodiments of the present invention will be described in detail with reference to the accompanying drawings.

Figure 4:
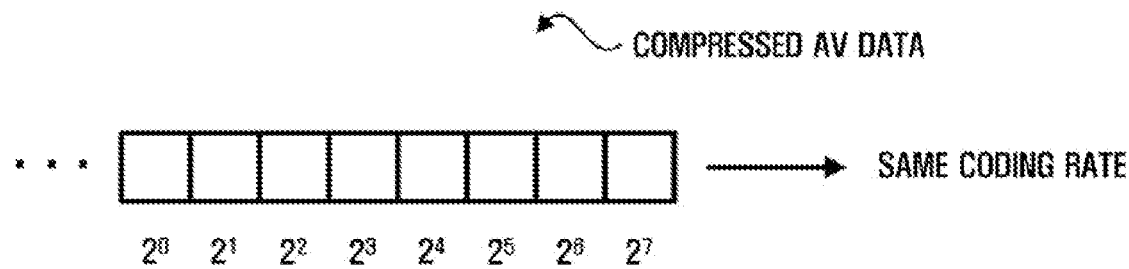
FIG. 4 is a diagram illustrating a related art error correction encoding method.
Figure 5:
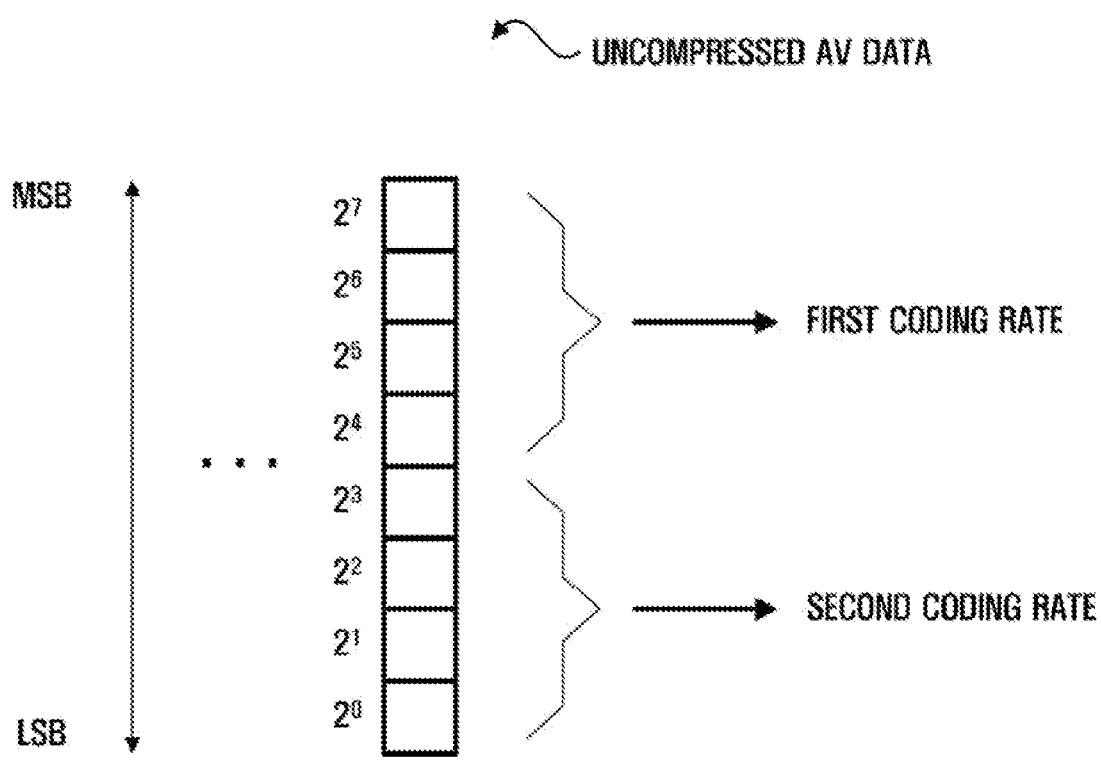
FIG. 5 is a diagram illustrating an error correction method according to an exemplary embodiment of the present invention.

FIG. 4 is a diagram illustrating a related art error correction encoding method, and FIG. 5 is a diagram illustrating an error correction method according to an exemplary embodiment of the present invention.

Compressed data is generated after processes for enhancing a compression rate, such as quantization and entropy-encoding. Therefore, there is no difference in priority or significance between bits that form each pixel of the compressed data. In this regard, referring to FIG. 4, compressed data is error-correction encoded at a fixed coding rate. Even if the compressed data is error-correction encoded at a variable coding rate, such error-correction encoding is based on external conditions such as communication environments, but not based on significance of each data bit.

Figure 2:
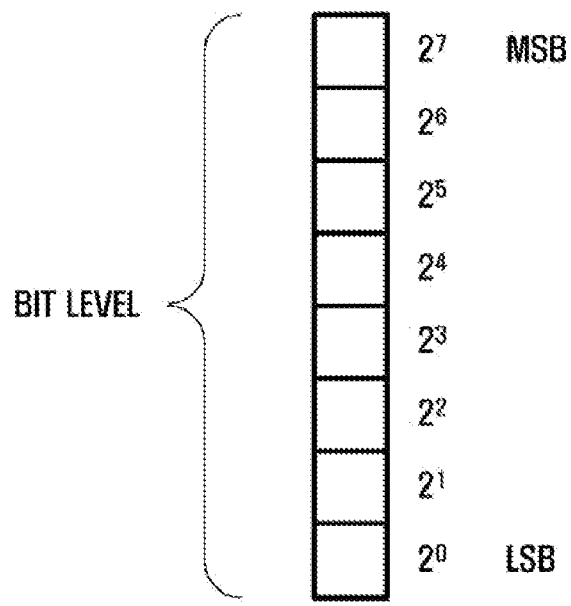
FIG. 2 is a diagram illustrating a plurality of bits levels of a pixel component.
Figure 3:
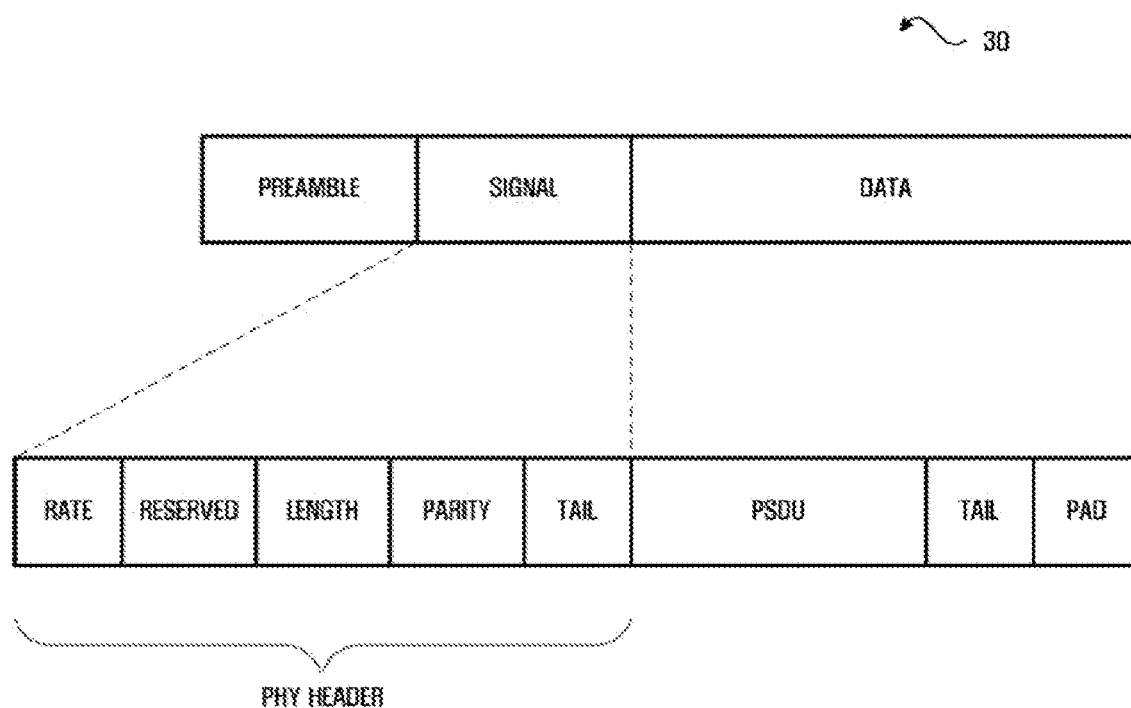
FIG. 3 is a diagram illustrating the structure of a PPDU of the IEEE 802.11a standard.

However, as described above with reference to FIG. 2, each bit of uncompressed data has different significance according to a bit level. Therefore, a plurality of bits included in a pixel may be divided into a plurality of groups according to a bit level, and each group may be error-correction coded at a different coding rate as illustrated in FIG. 5.

If all bits are error-correction encoded at different coding rates, the amount of computation required of a data transmission apparatus and a data reception apparatus may increase. Therefore, a plurality of bit levels may be divided into several groups, and each group may be error-correction encoded at a different coding rate. In this case, a lower coding rate is applied to bits included in a relatively more significant group.

A data transmission apparatus according to the present invention performs retransmission when an error occurs in a packet which has already been transmitted. In this case, all bits included in the packet may be error-correction coded at the same coding rate or at different coding rates according to bit-level groups by taking into consideration data processing capability of the data transmission apparatus, data processing capability of a data reception apparatus, and a network environment.

The data transmission apparatus may include the entire packet or one or more parts of the packet, in which the error has occurred, in a retransmission packet and transmit the retransmission packet accordingly. To this end, the packet may be divided into smaller units. Hereinafter, the smaller units of the packet may be referred to as subpackets.

Figure 6:
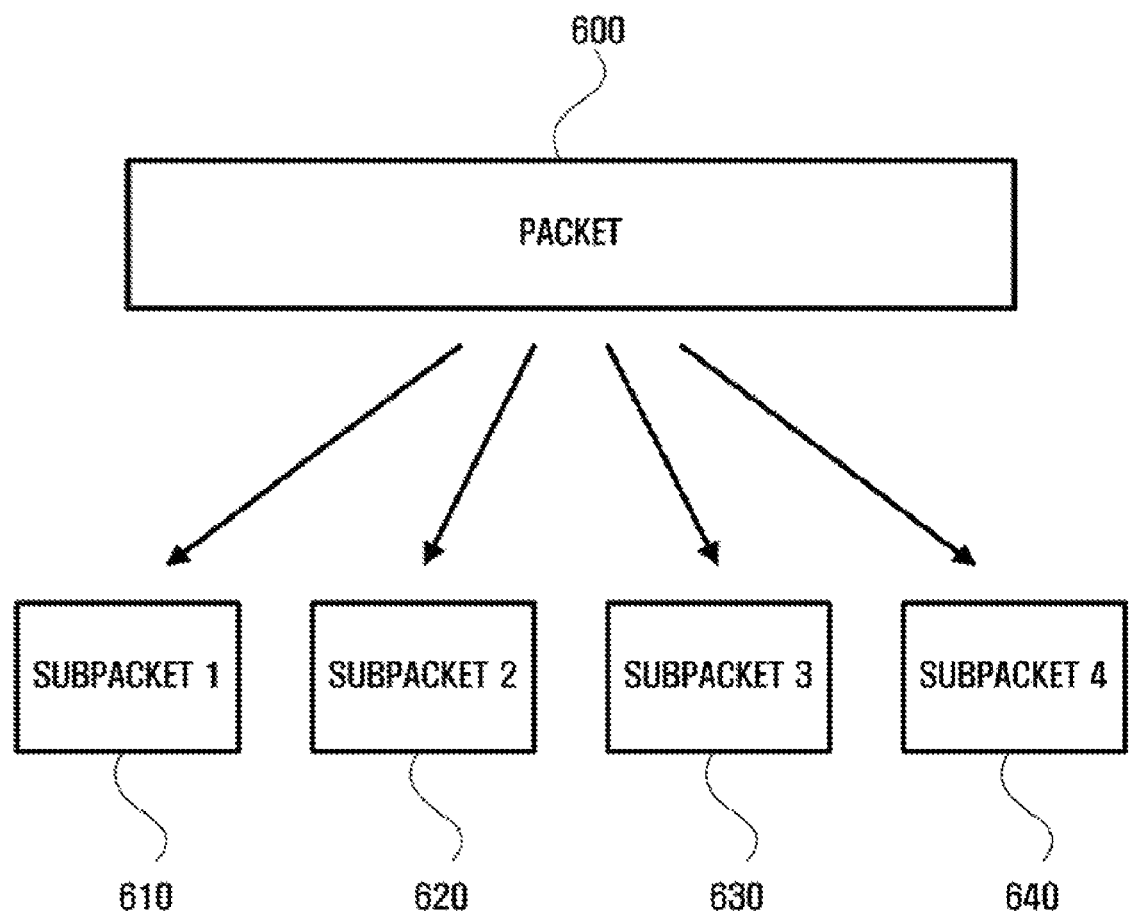
FIG. 6 illustrates subpackets according to an exemplary embodiment of the present invention.

FIG. 6 illustrates subpackets according to an exemplary embodiment of the present invention. Referring to FIG. 6, a packet 600 is divided into a plurality of subpackets 610 through 640.

Communication methods used in the present invention include a high rate physical layer (HRP) method which transmits data at high speed and a low rate physical layer (LRP) method which transmits data at low speed. The HRP method is used to transmit data at a transmission speed of 3 Gbps or higher, and the LRP method is used to transmit data at a transmission speed of 40 Mbps or lower.

The HRP method supports unidirectional data transmission, and data transmitted using the HRP method includes isochronous data, such as audio data and video data, asynchronous data, a media access control (MAC) command, antenna beam formation information, and control data of an upper layer for an audio/video (AV) device.

In addition, the LRP method supports bi-directional data transmission and reception, and data transmitted or received using the LRP method includes isochronous data sent at a low transmission rate, such as audio data, asynchronous data sent at a low transmission rate, an MAC command including a beacon frame, a response packet to an HRP packet, antenna beam formation information, performance information, and control data of an upper layer for an AV device.

In order to transmit data using the HRP method or the LRP method, the data transmission apparatus may divide the packet 600 into the subpackets 610 through 640 and transmit the packet 600 accordingly as illustrated in FIG. 6.

However, if the packet 600, which has been transmitted by the data transmission apparatus, has an error, a data reception apparatus transmits a packet (a response packet) indicating the occurrence of the error in the received packet 600 to the data transmission apparatus. Accordingly, the data transmission apparatus performs a retransmission operation for the packet 600 (hereinafter, referred to as an initial transmission packet) which has been transmitted.

In the retransmission operation, the data transmission apparatus may retransmit the entire initial transmission packet or one or more subpackets of the initial transmission packet which have errors. To this end, the data reception apparatus has to inform the data transmission apparatus about which ones of subpackets included in the received initial transmission packet have errors. Accordingly, the subpackets having errors may be specified in the response packet.

Figure 7:
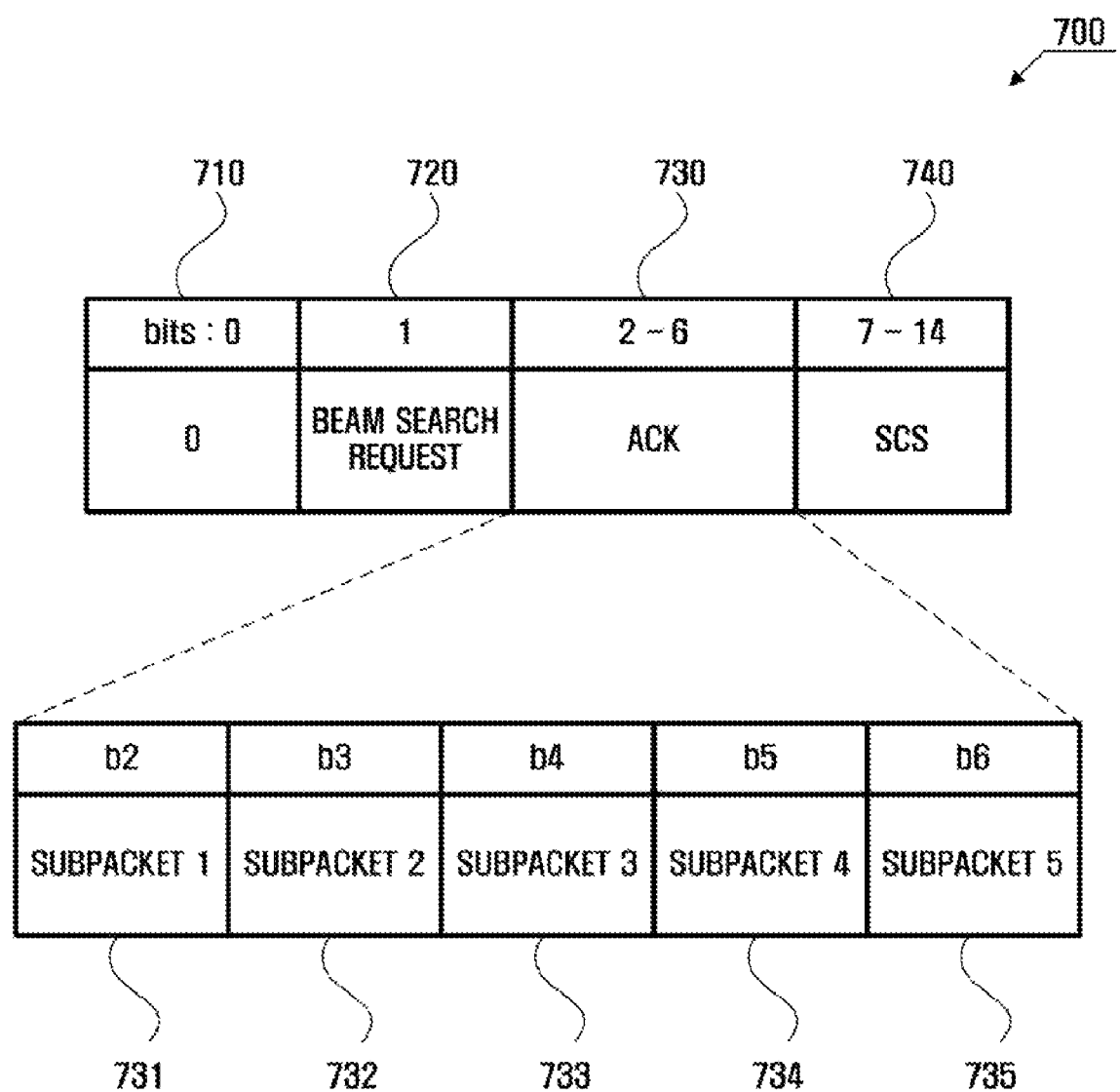
FIG. 7 illustrates a header of a response packet according to an exemplary embodiment of the present invention.

The response packet may be transmitted or received using the LRP method. FIG. 7 illustrates a header 700 of a response packet according to an exemplary embodiment of the present invention. The header 700 of the response packet may include a beam search request field 720, an acknowledgement (ACK) field 730, and a short check sequence (SCS) field 740.

The response packet announcing one or more subpackets, which have errors, according to the present embodiment does not require a separate payload. Accordingly, a first bit of the header 700 of the response packet may be set to zero. Thus, a station, which receives the response packet, learns from the first bit set to zero that the response packet does not have a payload. That is, the response packet includes only the header 700. In this regard, a response packet may hereinafter be understood as the header 700 of the response packet illustrated in FIG. 7.

The beam search request field 720 is used when a station requests another station to perform a beam search. For example, when a first station intends to transmit data to a second station using the HRP method, an antenna of the second station may face in the direction of the first station since the HRP method has directionality. Before transmitting the data, the first station may request the second station to perform a beam search in order to stably transmit the data. After setting the beam search request field 720 to one, if the first station transmits the response packet, i.e., the header 700, to the second station, the second station starts a beam search.

The ACK field 730 is used to indicate whether subpackets have been stably received. Each of a plurality of subpacket fields 731 through 735 indicates whether a corresponding subpacket has been stably received. For example, if a subpacket field is set to one, it indicates that a corresponding subpacket has been received stably. If the subpacket field is set to zero, it indicates that the corresponding subpacket has not been stably received.

When data is transmitted or received using the HRP method, if an HRP packet does not include a particular subpacket, a corresponding subpacket field may be set to zero.

The SCS field 740 is used to identify whether the entire response packet has an error. The SCS field 740 may include complements of an eight-bit cyclic redundancy checking (CRC) operation for the initial seven bits of the response packet, i.e., the header 700, or may be defined by the following polynomial expression.

$$x^8+x^2+x+1 \qquad (1).$$

Figure 8:
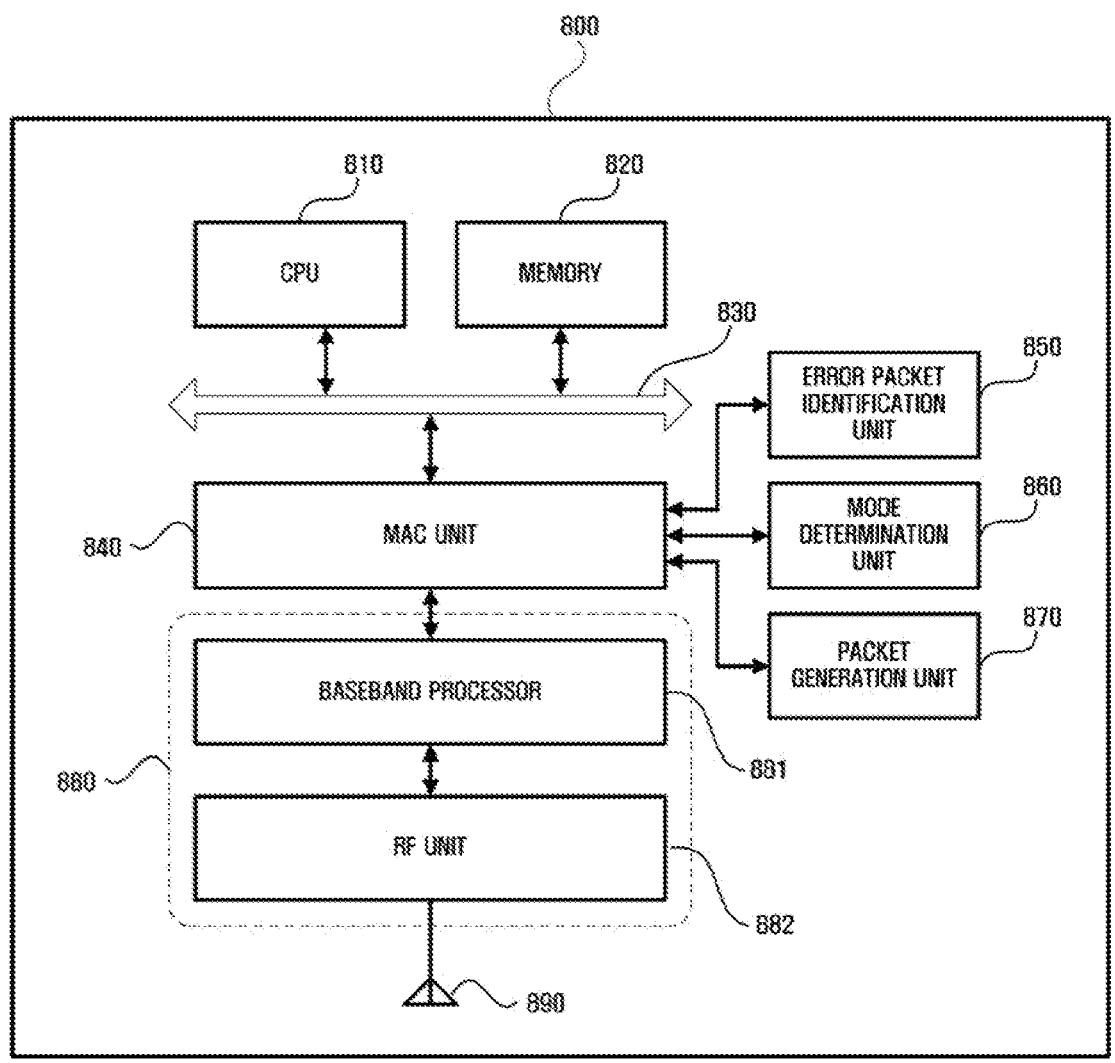
FIG. 8 is a block diagram of a data transmission apparatus according to an exemplary embodiment of the present invention.

FIG. 8 is a block diagram of a data transmission apparatus 800 according to an exemplary embodiment of the present invention. Referring to FIG. 8, the data transmission apparatus 800 includes a central processing unit (CPU) 810, a memory 820, an MAC unit 840, an error packet identification unit 850, a mode determination unit 860, a packet generation unit 870, and a communication unit 880.

The CPU 810 controls other components connected to a bus 830. In addition, the CPU 810 processes data provided by (a reception MAC service data unit (MSDU)) the MAC unit 840 or generates data (a transmission MSDU) and transmits the generated data to the MAC unit 840.

The memory 820 stores data. The memory 820 is a module which can input or output information, such as a compact flash (CF) card, a secure digital (SD) card, a smart media (SM) card, a multimedia card (MMC), or a memory stick. The memory 820 may be included in the data transmission apparatus 800 or in a separate apparatus.

The error packet identification unit 850 identifies whether an error has occurred in a transmitted packet. Here, the error packet identification unit 850 may identify whether each subpacket of the packet has an error. To this end, the error packet identification unit 850 may use a response packet received from a data reception apparatus.

When receiving data from the data transmission apparatus 800, the data reception apparatus identifies whether an error has occurred in each packet received. Then, the data reception apparatus transmits a response packet as the one illustrated in FIG. 7 to the data transmission apparatus 800. Accordingly, the error packet identification unit 850 identifies whether an error has occurred in each subpacket using the response packet received from the data reception apparatus.

The mode determination unit 860 determines a retransmission mode for a packet having an error. The retransmission mode is determined by a coding rate for initial data transmission and a coding rate for data retransmission.

That is, the retransmission mode includes at least one of first through fourth modes. In the first mode, a retransmission packet is generated by applying the same coding rate to bits included in all or part of an initial transmission packet which is composed of bits coded at the same coding rate, and the generated retransmission packet is transmitted. In the second mode, a retransmission packet is generated by applying different coding rates to bits included in all or part of an initial transmission packet which is composed of bits coded at the same coding rate, and the generated retransmission packet is transmitted. In the third mode, a retransmission packet is generated by applying the same coding rate to bits included in all or part of an initial transmission packet which is composed of bits coded at different coding rates, and the generated retransmission packet is transmitted. In the fourth mode, a retransmission packet is generated by applying different coding rates to bits included in all or part of an initial transmission packet which is composed of bits coded at different coding rates, and the generated retransmission packet is transmitted.

The mode determination unit 860 may determine a retransmission mode in consideration of data processing capability of the CPU 810, data processing capability of the data reception apparatus, and a network environment.

The packet generation unit 870 generates a packet (hereinafter, referred to as a retransmission packet), which includes all or part of an initial transmission packet, according to a retransmission mode determined by the mode determination unit 860.

The packet generation unit 870 may not include one or more subpackets without errors, among subpackets included in an initial transmission packet, in the retransmission packet and include one or more subpackets having errors in the retransmission packet. A packet may include a preset number of subpackets. Accordingly, the packet generation unit 870 may include null subpackets as well as subpackets having errors in the retransmission packet to correspond to the number of subpackets that can be included in the retransmission packet. For example, if the number of subpackets that can be included in the retransmission packet is four and three subpackets have errors, the packet generation unit 870 may include one null subpacket in the retransmission packet so that the retransmission packet having four subpackets can be transmitted.

The retransmission packet generated by the packet generation unit 870 may be repeatedly transmitted a predetermined number of times within a preset threshold frequency according to delay characteristics of data included in the initial transmission packet. For example, after the retransmission packet including data is transmitted, if a period of time during which the retransmission packet can be transmitted two times is secured, the retransmission packet can be repeated transmitted up to two times.

In addition, the packet generation unit 870 may include new subpackets as well as subpackets having transmission errors, among subpackets of an initial transmission packet, in the retransmission packet or redundantly include the subpackets having transmission errors in the retransmission packet.

The packet generation unit 870 may not include one or more subpackets without transmission errors, among subpackets of an initial transmission packet, in the retransmission packet and may include most significant bits (MSBs) of one or more subpackets having transmission errors in the retransmission packet.

In the present invention, an MSB denotes a bit with greater significance than other bits included in a subpacket. The MSB may have been coded at a higher coding rate than less significant bits. In addition, when a subpacket is composed of eight bits, four upper bits may be MSBs. Accordingly, two MSBs may form a subpacket.

If two MSBs form a subpacket, a retransmission packet including one or more subpackets may have an even number of MSBs. However, if the number of MSBs is one or three because the number of subpackets having errors is one or three, that is, if the entire size of the MSBs is different from that of the subpackets, there is a lack of space for forming the subpackets. In this case, the packet generation unit 870 may include null bits in the retransmission packet in order to compensate for the insufficient space. Accordingly, the entire size of the MSBs included in the retransmission packet may be synchronized with the size of at least one subpacket.

In addition, the packet generation unit 870 may include MSBs of one or more subpackets having transmission errors, among subpackets of an initial transmission packet, and MSBs of one or more new subpackets in the retransmission packet or redundantly include the MSBs of the subpackets having the transmission errors in the retransmission packet.

When generating a retransmission packet, the packet generation unit 870 may configure the retransmission packet in consideration of data types so that subpackets including similar types of data are placed adjacent to each other. That is, subpackets including audio data may be placed adjacent to each other, and subpackets including video data may be placed adjacent to each other. For example, if first, third, and fifth ones of first through fifth subpackets have been received without errors and if the second and fourth subpackets including video data have been lost, sixth through eighth subpackets, which are new subpackets, as well as the second and fourth subpackets may be transmitted. Here, if the sixth subpacket includes audio data or control information, the subpackets included in the retransmission packet are arranged in order of the sixth, second, fourth, seventh and eighth subpackets.

The communication unit 880 converts a retransmission packet generated by the packet generation unit 870 into a radio signal and transmits the radio signal to the data reception apparatus through a predetermined communication channel. Here, the communication unit 880 may transmit the retransmission packet at different speed according to the number of subpackets or the number of MSBs included in the retransmission packet.

The time required to transmit an initial transmission packet may be equal to the time required to transmit a retransmission packet. That is, transmission duration of the initial transmission packet and that of the retransmission packet may be equal to each other regardless of the number of subpackets included in the retransmission packet. For example, if the transmission duration of an initial transmission packet is 200 us, the transmission duration of a retransmission packet including one, two or four subpackets may be 200 us.

In addition, the transmission duration of a retransmission packet may vary according to the number of subpackets included in the retransmission packet. For example, if the transmission duration of a retransmission packet including four subpackets is 200 us, the transmission duration of a retransmission packet including two subpackets may be 100 us, and that of a retransmission packet including one subpacket may be 50 us. In this case, the transmission speed of a retransmission packet may remain unchanged regardless of the number of subpackets included in the retransmission packet. For example, if the transmission speed of a retransmission packet including four subpackets is 3.88 Gbps, the transmission speed of a retransmission packet including one or two subpackets may also be 3.88 Gbps.

In addition, the communication unit 880 may transmit a retransmission packet by applying different transmission duration according to transmission speed. In this case, the communication unit 880 may transmit the retransmission packet by applying transmission duration determined according to transmission speed, so that a value obtained after the time required to transmit a subpacket is multiplied by the transmission speed of the subpacket can be maintained constant. For example, if the transmission duration of a subpacket is 50 us and the transmission speed of the subpacket is 3.88 Gbps, a value obtained after the transmission duration is multiplied by the transmission speed is 194. Accordingly, if the transmission speed is 1.94 Gbps, the communication unit 880 may transmit the retransmission packet by applying transmission duration of 100 (=194/1.94) us. The communication unit 880 may determine transmission duration without considering a reference value. For example, if the transmission speed is 0.97 Gbps, the communication unit 880 may select one of various transmission duration, such as 50, 100 and 200 us, in order to transmit one subpacket. That is, the communication unit 880 may transmit the retransmission packet using one of various combinations of transmission speed and transmission duration.

The communication unit 880 includes a baseband processor 881 and a radio frequency (RF) unit 882 and is connected to an antenna 890. The antenna 890 may transmit or receive an omni-directional low-frequency band radio signal or a directional high-frequency band radio signal. Here, a frequency band of a communication channel formed by the RF unit 882 includes 2.4 GHz or 5 GHz in the case of a low-frequency band and includes 60 GHz in the case of a high-frequency band.

Figure 9:
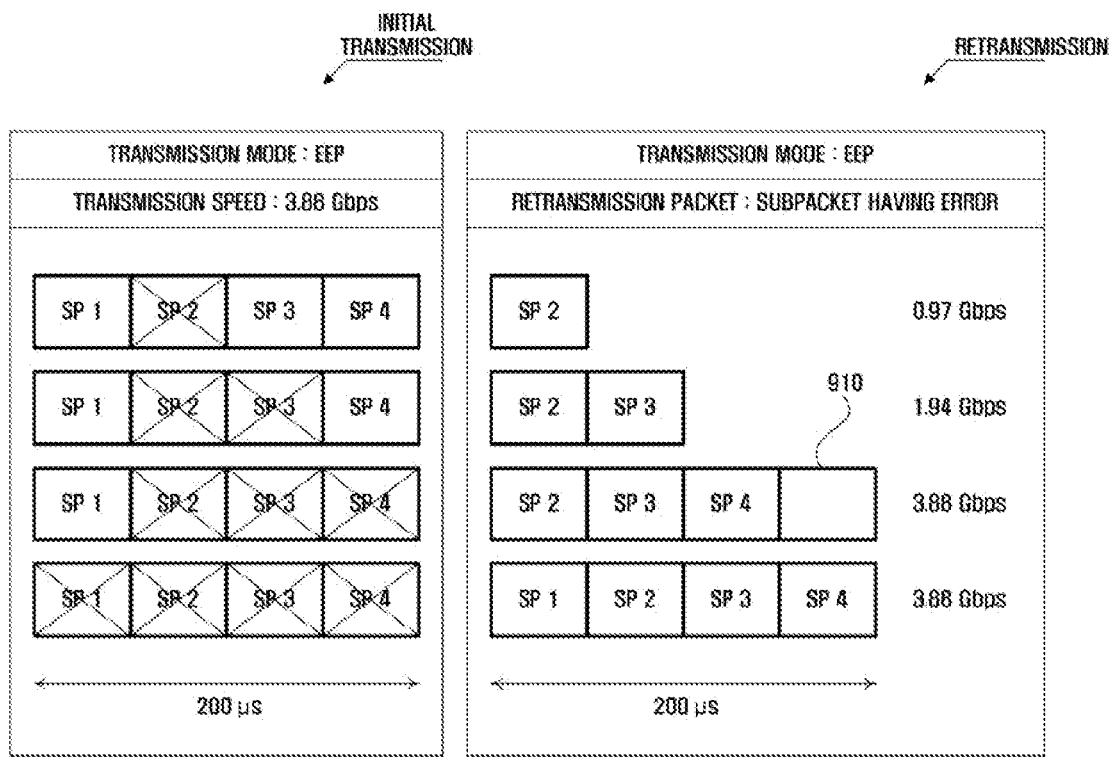
FIG. 9 illustrates subpackets when data is transmitted in a first mode according to an exemplary embodiment of the present invention.

FIG. 9 illustrates subpackets when data is transmitted in the first mode according to an exemplary embodiment of the present invention.

As described above, the first mode refers to a mode in which all bits included in data are coded at an equal error protection rate and transmitted and retransmitted accordingly. FIG. 9 illustrates a case where one or more subpackets included in an initial transmission packet have errors, and a retransmission packet is composed of the subpackets having the errors.

Referring to FIG. 9, each packet may be composed of four subpackets and transmitted at a predetermined transmission speed within a predetermined time period.

The transmission speed of a retransmission packet may be determined by the number of subpackets having errors among subpackets of an initial transmission packet. For example, if the number of subpackets having errors is one, the transmission speed of the retransmission packet may be a quarter of the transmission speed of the initial transmission packet. If the number of subpackets having errors is two, the transmission speed of the retransmission packet may be half the transmission speed of the initial transmission packet.

If the number of subpackets having errors is three, the transmission speed of the retransmission packet may be three quarters of the transmission speed of the initial transmission packet or may be equal to the transmission speed of the initial transmission packet. In this case, the packet generation unit 870 may insert a null subpacket 910 into the retransmission packet, thereby synchronizing the number of subpackets included in the initial transmission packet with that of subpackets included in the retransmission packet.

Figure 10:
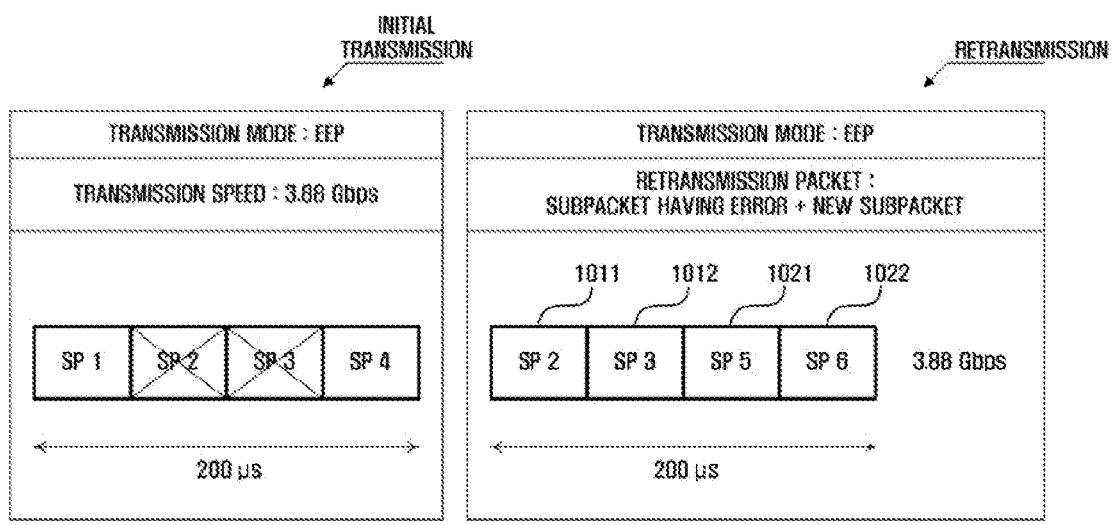
FIG. 10 illustrates subpackets when data is transmitted in the first mode according to another exemplary embodiment of the present invention.

FIG. 10 illustrates subpackets when data is transmitted in the first mode according to another exemplary embodiment of the present invention. FIG. 10 illustrates a case where one or more subpackets of an initial transmission packet have errors, and a retransmission packet is composed of the subpackets having the errors.

Referring to FIG. 10, a retransmission packet generated may include new subpackets 1021 and 1022 as well as subpackets 1011 and 1012 having errors. The number of new subpackets may be determined by the number of subpackets having errors. That is, since a packet can include four subpackets, if the number of subpackets having errors is one, the number of new subpackets may be three. If the number of subpackets having errors is two, the number of new subpackets may be two.

The transmission speed of the retransmission packet, which includes the subpackets 1011 and 1012 having the errors and the new subpackets 1021 and 1022, may be equal to that of an initial transmission packet.

Figure 11:
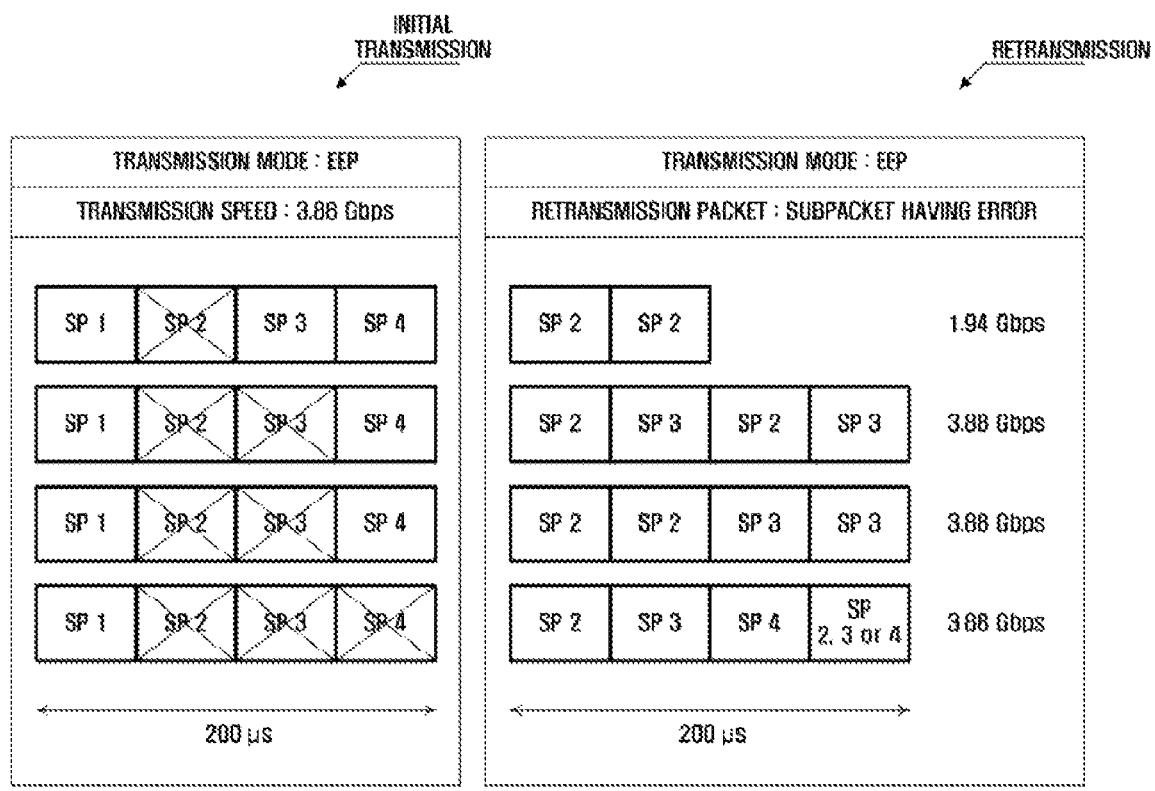
FIG. 11 illustrates subpackets when data is transmitted in the first mode according to another exemplary embodiment of the present invention.

FIG. 11 illustrates subpackets when data is transmitted in the first mode according to another exemplary embodiment of the present invention. FIG. 11 illustrates a case where one or more subpackets of an initial transmission packet have errors, and a retransmission packet is composed of the subpackets having the errors.

Referring to FIG. 11, a retransmission packet generated may redundantly include subpackets having errors. If the number of subpackets having errors is two, the subpackets having the errors may be arranged according to a preset policy. For example, the same subpackets may be arranged successively or at predetermined intervals. In this case, the same subpackets may be arranged with a predetermined gap therebetween in order to avoid a situation where an error occurring at a point of a packet is spread to regions adjacent to the point.

In addition, if the number of subpackets having errors is three, only one space is available for a redundant subpacket. In this case, one of the subpackets having the errors may be redundantly inserted into the available space.

If the number of subpackets included in the retransmission packet is two, the transmission speed of the retransmission packet may be half the transmission speed of an initial transmission packet. If the number of subpackets included in the retransmission packet is four, the transmission speed of the retransmission packet may be equal to that of the initial transmission packet.

Figure 12:
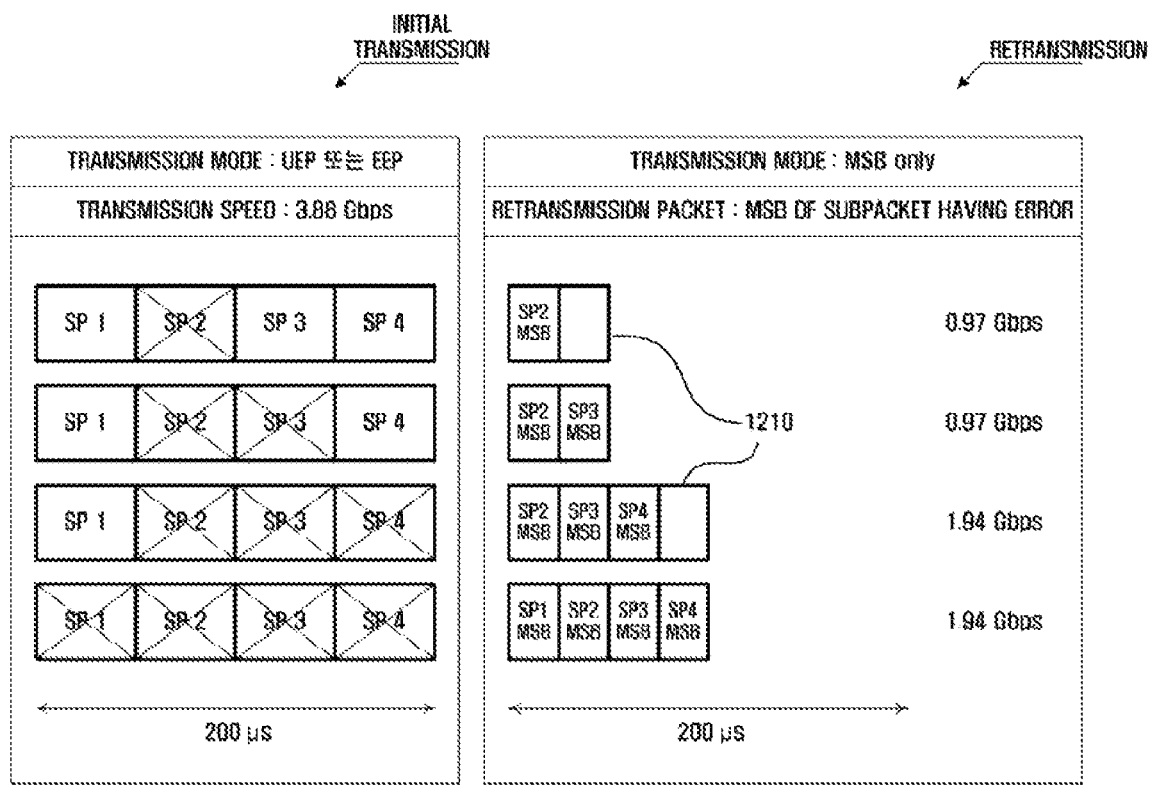
FIG. 12 illustrates subpackets when data is transmitted in a second mode or a fourth mode according to an exemplary embodiment of the present invention.

FIG. 12 illustrates subpackets when data is transmitted in the second mode or the fourth mode according to an exemplary embodiment of the present invention.

The second mode refers to a mode in which all bits included in data are coded at an equal error protection rate and transmitted accordingly and in which each bit group included in the data is coded at an unequal error protection rate and retransmitted accordingly. The fourth mode refers to a mode in which each bit group included in data is coded at an unequal error protection rate and transmitted and retransmitted accordingly. FIG. 12 illustrates a case where one or more subpackets of an initial transmission packet have errors, and a retransmission packet is composed of MSBs of the subpackets having the errors.

Referring to FIG. 12, an initial transmission packet may be composed of four subpackets and transmitted at a predetermined transmission speed within a predetermined time period. Since a retransmission packet includes MSBs only, the size of the retransmission packet may be half the size of the initial transmission packet. Accordingly, the transmission speed of the retransmission packet may also be half the transmission speed of the initial transmission packet.

In order to synchronize the entire size of the MSBs with that of subpackets, the packet generation unit 870 may insert null bits 1210 into the retransmission packet as described above.

Figure 13:
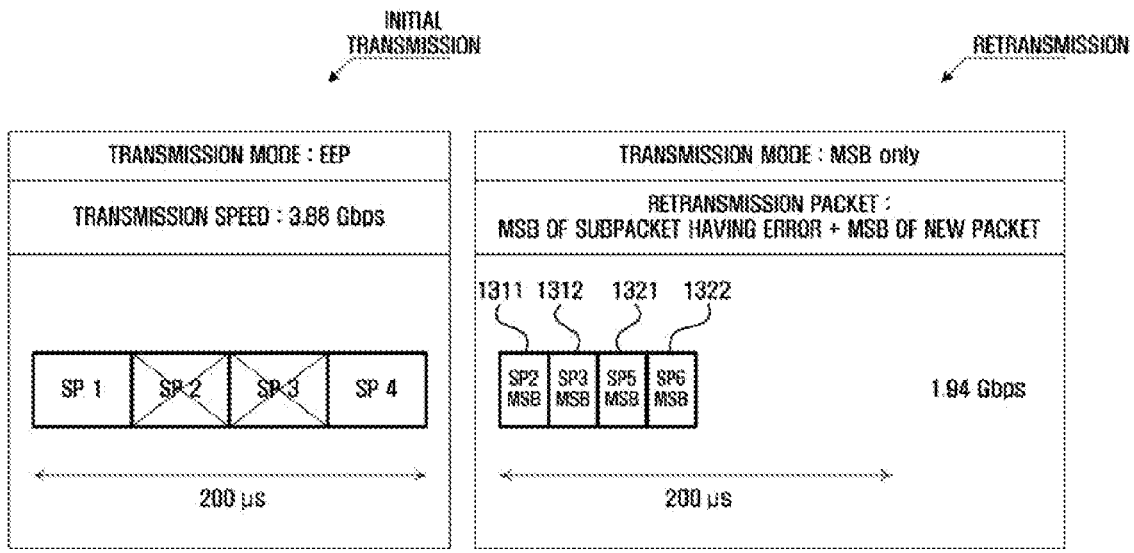
FIG. 13 illustrates subpackets when data is transmitted in the second mode according to another exemplary embodiment of the present invention.

FIG. 13 illustrates subpackets when data is transmitted in the second mode according to another exemplary embodiment of the present invention. FIG. 13 illustrates a case where one or more subpackets of an initial transmission packet have errors, and a retransmission packet is composed of the subpackets having the errors.

Referring to FIG. 13, a retransmission packet generated may include MSBs 1321 and 1322 of new subpackets as well as MSBs 1311 and 1312 of subpackets having errors. The number of MSBs of new subpackets may be determined by the number of subpackets having errors. That is, in the exemplary embodiment, one retransmission packet may include four MSBs. Therefore, if the number of subpackets having errors is one, the number of MSBs of new subpackets may be three. If the number of subpackets having errors is two, the number of MSBs of the new subpackets may be two.

Since the size of the retransmission packet composed of the MSBs 1311, 1312, 1321 and 1322 is half the size of an initial transmission packet, the transmission speed of the retransmission packet may be half the transmission speed of the initial transmission packet.

Figure 14:
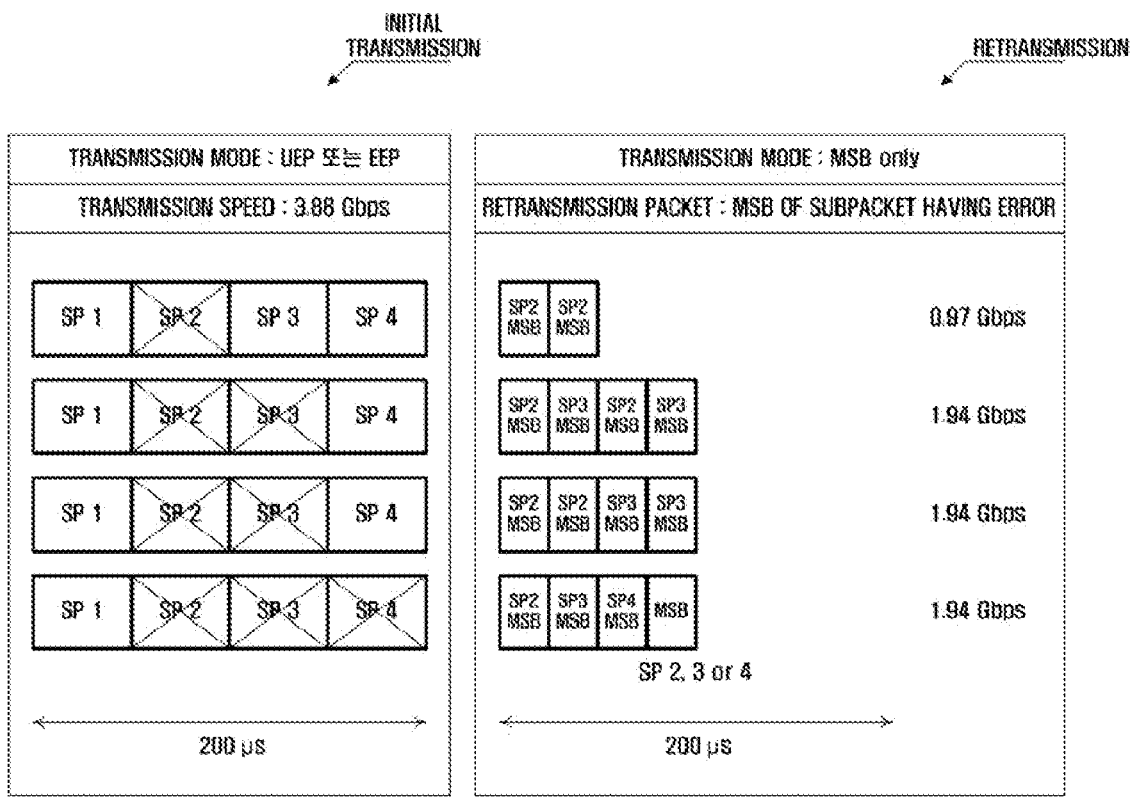
FIG. 14 illustrates subpackets when data is transmitted in the second mode or the fourth mode according to an exemplary embodiment of the present invention.

FIG. 14 illustrates subpackets when data is transmitted in the second mode or the fourth mode according to an exemplary embodiment of the present invention. FIG. 14 illustrates a case where one or more subpackets of an initial transmission packet have errors, and a retransmission packet is composed of the subpackets having the errors.

Referring to FIG. 14, a retransmission packet generated may redundantly include MSBs of subpackets having errors. If the number of subpackets having errors is two, MSBs may be arranged according to a preset policy. For example, the same MSBs may be arranged successively or at predetermined intervals. In this case, the same MSBs may be arranged with a predetermined gap therebetween in order to avoid a situation where an error occurring at a point of a packet is spread to regions adjacent to the point.

In addition, if the number of subpackets having errors is three, only one space is available for a redundant MSB. In this case, one of MSBs of the subpackets having errors may be redundantly inserted into the available space.

If the number of MSBs included in the retransmission packet is two, the transmission speed of the retransmission packet is half the transmission speed of an initial transmission packet. If the number of MSBs included in the retransmission packet is four, the transmission speed of the retransmission packet may be equal to that of the initial transmission packet.

Figure 15:
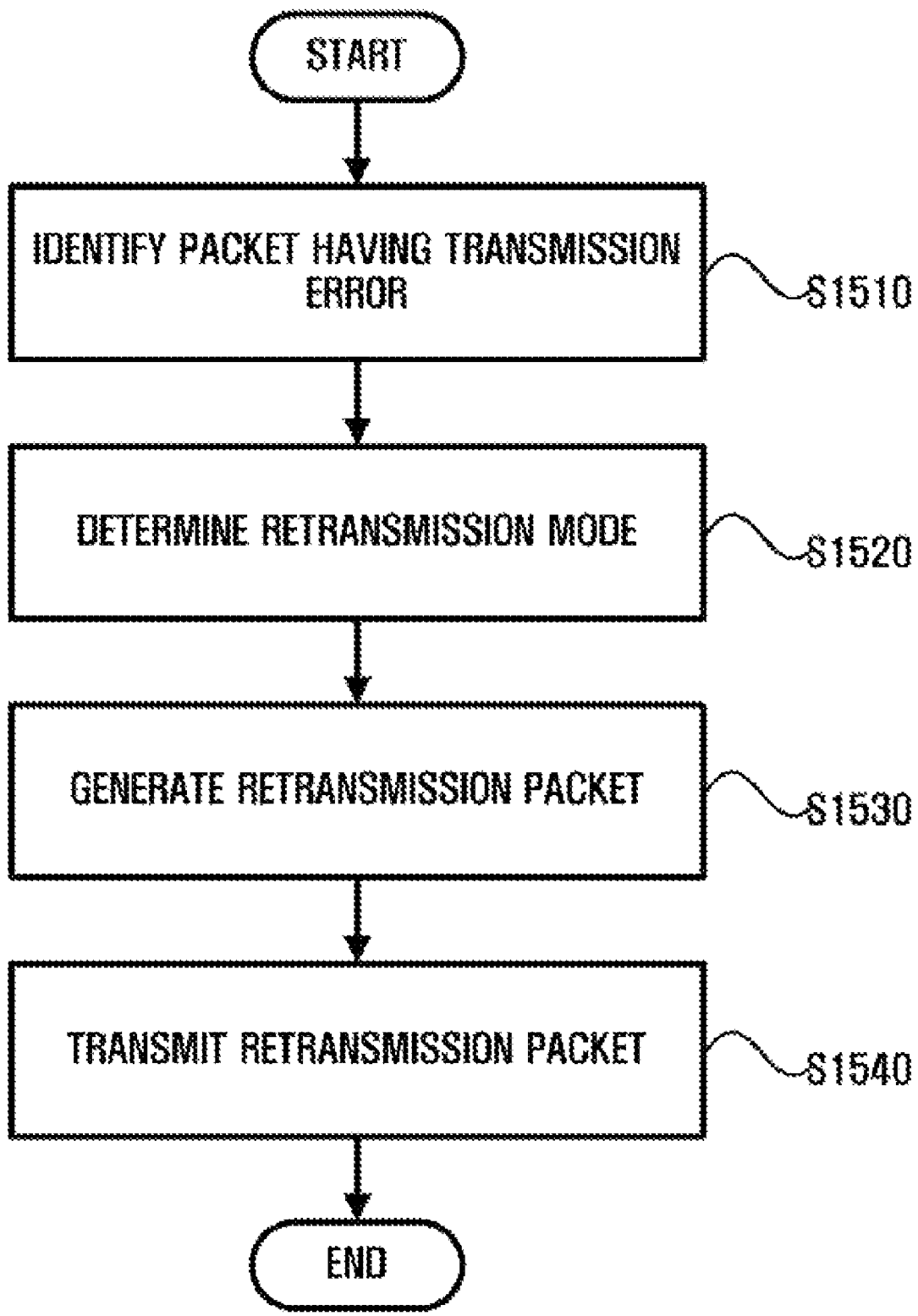
FIG. 15 is a flowchart illustrating a data transmission process according to an exemplary embodiment of the present invention.

FIG. 15 is a flowchart illustrating a data transmission process according to an exemplary embodiment of the present invention.

In order to transmit a retransmission packet when data already transmitted has an error, the data transmission apparatus 800 identifies one or more subpackets having errors (operation S1510).

The error identification unit 850 may identify the subpackets having the errors based on a response packet received from the data reception apparatus.

The error packet identification unit 850 transmits the identification result to the mode determination unit 860, and the mode determination unit 860 determines a retransmission mode (operation S1520). Here, the mode determination unit 860 determines a retransmission mode in consideration of the data processing capability of the CPU 810, the data processing capability of the data reception apparatus, and a network environment.

The packet generation unit 870 generates a retransmission packet according to a retransmission mode determined by the mode determination unit 860 (operation S1530). That is, the packet generation unit 870 may generate a retransmission packet by inserting only the subpackets having the errors into the retransmission packet or only MSBs of the subpackets having the errors into the retransmission packet. In addition, the packet generation unit 870 may insert one or more null subpackets or one or more null bits into the retransmission packet or insert one or more new subpacket or MSBs of the new subpackets into the retransmission packet.

The retransmission packet generated by the packet generation unit 870 is transmitted through the communication unit 880 (operation S1540). Here, the communication unit 880 may transmit the retransmission packet at different transmission speed, such as 0.97, 1.94 or 3.88 Gbps, according to the number of subpackets or the number of MSBs included in the retransmission packet. In addition, the retransmission packet may be transmitted by applying different transmission duration according to transmission speed.

As described above, a data transmission apparatus and method according to the exemplary embodiments of the present invention may provide the following advantages.

First, when an error occurs in data while the data is being transmitted, an appropriate coding rate is applied according to significance of bits or bit groups included in the data, and all or part of the data is retransmitted accordingly. Therefore, the stability of data transmission can be increased, and transmission efficiency can be enhanced.

Second, different transmission speed may be applied according to the number of pieces of subdata to be retransmitted. Therefore, maximum stability can be guaranteed in transmitting data within a unit time.

While the present invention has been particularly shown and described with reference to exemplary embodiments thereof, it will be understood by those of ordinary skill in the art that various changes in form and detail may be made therein without departing from the spirit and scope of the present invention as defined by the following claims. The exemplary embodiments should be considered in descriptive sense only and not for purposes of limitation.

What is claimed is:

1. A data transmission method comprising:
   determining a retransmission mode for an initial transmission packet which has a transmission error;
   generating a retransmission packet, which comprises at least part of the initial transmission packet, according to the determined retransmission mode; and
   transmitting the retransmission packet through a communication channel,
   wherein the determining the retransmission mode comprises selecting the retransmission mode from a plurality of retransmission modes based on a network environment, the plurality of retransmission modes comprising at least one of:
   a first mode in which the retransmission packet is generated by applying a same coding rate to bits included in the at least part of the initial transmission packet which is comprised of bits coded at the same coding rate and in which the generated retransmission packet is transmitted;
   a second mode in which the retransmission packet is generated by applying different coding rates to the bits included in the at least part of the initial transmission packet which is comprised of the bits coded at the same coding rate and in which the generated retransmission packet is transmitted;
   a third mode in which the retransmission packet is generated by applying the same coding rate to the bits included in the at least part of the initial transmission packet which is comprised of the bits coded at different coding rates and in which the generated retransmission packet is transmitted; and
   a fourth mode in which the retransmission packet is generated by applying different coding rates to the bits included in the at least part of the initial transmission packet which is comprised of the bits coded at different coding rates and in which the generated retransmission packet is transmitted,
   wherein the generating the retransmission packet comprises including most significant bits (MSBs) of at least one subpacket having a transmission error, among subpackets of the initial transmission packet, and MSBs of at least one new subpacket, in the retransmission packet, wherein the least significant bits (LSBs) of the at least one subpacket and the LSBs of the at least one new subpacket are excluded from the retransmission packet.

2. The method of claim 1, wherein the generating the retransmission packet comprises including at least one subpacket having a transmission error, among subpackets of the initial transmission packet, in the retransmission packet.

3. The method of claim 2, wherein the transmitting the retransmission packet comprises transmitting the retransmission packet at a transmission speed determined based on a number of subpackets, which have transmission errors, included in the retransmission packet.

4. The method of claim 2, wherein the generating the retransmission packet comprises including the at least one subpacket having the transmission error and at least one null subpacket in the retransmission packet to correspond to a number of subpackets that can be included in the retransmission packet.

5. The method of claim 1, wherein the retransmission packet is repeatedly transmitted a number of times within a preset threshold frequency according to delay characteristics of data included in the initial transmission packet.

6. The method of claim 1, wherein the generating the retransmission packet comprises including at least one subpacket having a transmission error, among subpackets of the initial transmission packet, and at least one new subpacket, in the retransmission packet.

7. The method of claim 1, wherein the generating the retransmission packet comprises redundantly including at least one subpacket having a transmission error, among subpackets of the initial transmission packet, in the retransmission packet.

8. The method of claim 7, wherein identical subpackets among the subpackets redundantly included in the retransmission packet are arranged successively or at predetermined intervals.

9. The method of claim 1, wherein the generating the retransmission packet comprises redundantly including the MSBs of the at least one subpacket having the transmission error, among the subpackets of the initial transmission packet, in the retransmission packet.

10. The method of claim 9, wherein identical MSBs among the MSBs redundantly included in the retransmission packet may be arranged successively or at predetermined intervals.

11. A data transmission method comprising:
   determining a retransmission mode for an initial transmission packet which has a transmission error;
   generating a retransmission packet, which comprises at least part of the initial transmission packet, according to the determined retransmission mode; and
   transmitting the retransmission packet through a communication channel,
   wherein the determining the retransmission mode comprises selecting the retransmission mode from a plurality of retransmission modes based on a network environment, the plurality of retransmission modes comprising at least one of:
   a first mode in which the retransmission packet is generated by applying a same coding rate to bits included in the at least part of the initial transmission packet which is comprised of bits coded at the same coding rate and in which the generated retransmission packet is transmitted;
   a second mode in which the retransmission packet is generated by applying different coding rates to the bits included in the at least part of the initial transmission packet which is comprised of the bits coded at the same coding rate and in which the generated retransmission packet is transmitted;
   a third mode in which the retransmission packet is generated by applying the same coding rate to the bits included in the at least part of the initial transmission packet which is comprised of the bits coded at different coding rates and in which the generated retransmission packet is transmitted; and
   a fourth mode in which the retransmission packet is generated by applying different coding rates to the bits included in the at least part of the initial transmission packet which is comprised of the bits coded at different coding rates and in which the generated retransmission packet is transmitted,
   wherein the generating the retransmission packet comprises generating the retransmission packet by placing subpackets having similar types of data adjacent to each other according to types of data included in each subpacket of the retransmission packet.

12. The method of claim 11, wherein the generating of the retransmission packet comprises setting an order of arrangement of a first subpacket to precede an order of arrangement of a second subpacket in the retransmission packet, if the plurality of subpackets which constitute the retransmission packet include the first subpacket including audio data or audio/video control information and the second subpacket including video data.

13. A data transmission method comprising:
   determining a retransmission mode for an initial transmission packet which has a transmission error;
   generating a retransmission packet, which comprises at least part of the initial transmission packet, according to the determined retransmission mode; and
   transmitting the retransmission packet through a communication channel,
   wherein a transmission duration of the initial transmission packet is equal to a transmission duration of the retransmission packet.

14. A data transmission method comprising:
   determining a retransmission mode for an initial transmission packet which has a transmission error;
   generating a retransmission packet, which comprises at least part of the initial transmission packet, according to the determined retransmission mode; and
   transmitting the retransmission packet through a communication channel,
   wherein a transmission duration of the retransmission packet varies according to a number of subpackets included in the retransmission packet.

15. The method of claim 14, wherein the transmitting the retransmission packet comprises transmitting the retransmission packet at a same transmission speed regardless of the number of subpackets included in the retransmission packet or transmitting the retransmission packet at a transmission speed determined based on the number of subpackets included in the retransmission packet.

16. The method of claim 14, wherein the transmission duration of the retransmission packet does not exceed a transmission duration of the initial transmission packet.

17. A data transmission apparatus comprising:
   a mode termination unit which determines a retransmission mode for an initial transmission packet which has a transmission error;
   a packet generation unit which generates a retransmission packet, which comprises at least part of the initial transmission packet, according to the retransmission mode determined by the mode termination unit; and
   a communication unit which transmits the retransmission packet through a communication channel,
   wherein the mode termination unit determines the retransmission mode by selecting the retransmission mode from a plurality of retransmission modes based on a network environment, the plurality of retransmission modes comprising at least one of:
   a first mode in which the retransmission packet is generated by applying a same coding rate to bits included in the at least part of the initial transmission packet which is comprised of bits coded at the same coding rate and in which the generated retransmission packet is transmitted;
   a second mode in which the retransmission packet is generated by applying different coding rates to the bits included in the at least part of the initial transmission packet which is comprised of the bits coded at the same coding rate and in which the generated retransmission packet is transmitted;
   a third mode in which the retransmission packet is generated by applying the same coding rate to the bits included in the at least part of the initial transmission packet which is comprised of the bits coded at different coding rates and in which the generated retransmission packet is transmitted; and
   a fourth mode in which the retransmission packet is generated by applying different coding rates to the bits included in the at least part of the initial transmission packet which is comprised of the bits coded at different coding rates and in which the generated retransmission packet is transmitted,
   wherein, when generating the retransmission packet, the packet generation unit includes most significant bits (MSBs) of at least one subpacket having a transmission error, among subpackets of the initial transmission packet, and MSBs of at least one new subpacket, in the retransmission packet, wherein the least significant bits (LSBs) of the at least one subpacket and the LSBs of the at least one new subpacket are excluded from the retransmission packet.

18. The apparatus of claim 17, wherein, when generating the retransmission packet, the packet generation unit includes at least one subpacket having a transmission error, among subpackets of the initial transmission packet, in the retransmission packet or includes the at least one subpacket having the transmission error, among the subpackets of the initial transmission packet, and at least one new subpacket, in the retransmission packet.

19. The apparatus of claim 18, wherein the packet generation unit includes the at least one subpacket having the transmission error and at least one null subpacket in the retransmission packet to correspond to a number of subpackets that can be included in the retransmission packet.

20. The apparatus of claim 17, wherein, when generating the retransmission packet, the packet generation unit redundantly includes at least one subpacket having a transmission error, among subpackets of the initial transmission packet, in the retransmission packet.

21. The apparatus of claim 20, wherein identical subpackets among the subpackets redundantly included in the retransmission packet are arranged successively or at predetermined intervals.

22. A data transmission apparatus comprising:
a mode termination unit which determines a retransmission mode for an initial transmission packet which has a transmission error;
a packet generation unit which generates a retransmission packet, which comprises at least part of the initial transmission packet, according to the retransmission mode determined by the mode termination unit; and
a communication unit which transmits the retransmission packet through a communication channel,
wherein the mode termination unit determines the retransmission mode by selecting the retransmission mode from a plurality of retransmission modes based on a network environment, the plurality of retransmission modes comprising at least one of:
a first mode in which the retransmission packet is generated by applying a same coding rate to bits included in the at least part of the initial transmission packet which is comprised of bits coded at the same coding rate and in which the generated retransmission packet is transmitted;
a second mode in which the retransmission packet is generated by applying different coding rates to the bits included in the at least part of the initial transmission packet which is comprised of the bits coded at the same coding rate and in which the generated retransmission packet is transmitted;
a third mode in which the retransmission packet is generated by applying the same coding rate to the bits included in the at least part of the initial transmission packet which is comprised of the bits coded at different coding rates and in which the generated retransmission packet is transmitted; and
a fourth mode in which the retransmission packet is generated by applying different coding rates to the bits included in the at least part of the initial transmission packet which is comprised of the bits coded at different coding rates and in which the generated retransmission packet is transmitted,
wherein, when generating the retransmission packet, the packet generation unit redundantly includes most significant bits of at least one subpacket having a transmission error, among subpackets of the initial transmission packet, in the retransmission packet.

23. A data transmission apparatus comprising:
a mode termination unit which determines a retransmission mode for an initial transmission packet which has a transmission error;
a packet generation unit which generates a retransmission packet, which comprises at least part of the initial transmission packet, according to the retransmission mode determined by the mode termination unit; and
a communication unit which transmits the retransmission packet through a communication channel,
wherein the mode termination unit determines the retransmission mode by selecting the retransmission mode from a plurality of retransmission modes based on a network environment, the plurality of retransmission modes comprising at least one of:
a first mode in which the retransmission packet is generated by applying a same coding rate to bits included in the at least part of the initial transmission packet which is comprised of bits coded at the same coding rate and in which the generated retransmission packet is transmitted;
a second mode in which the retransmission packet is generated by applying different coding rates to the bits included in the at least part of the initial transmission packet which is comprised of the bits coded at the same coding rate and in which the generated retransmission packet is transmitted;
a third mode in which the retransmission packet is generated by applying the same coding rate to the bits included in the at least part of the initial transmission packet which is comprised of the bits coded at different coding rates and in which the generated retransmission packet is transmitted; and
a fourth mode in which the retransmission packet is generated by applying different coding rates to the bits included in the at least part of the initial transmission packet which is comprised of the bits coded at different coding rates and in which the generated retransmission packet is transmitted,
wherein if the plurality of subpackets which constitute the retransmission packet include a first subpacket including audio data or audio/video control information and a second subpacket including video data, an order of arrangement of the first subpacket to precede an order of arrangement of the second subpacket in the retransmission packet.

24. A data transmission apparatus comprising:
a mode termination unit which determines a retransmission mode for an initial transmission packet which has a transmission error;
a packet generation unit which generates a retransmission packet, which comprises at least part of the initial transmission packet, according to the retransmission mode determined by the mode termination unit; and
a communication unit which transmits the retransmission packet through a communication channel,
wherein a transmission duration of the retransmission packet varies according to a number of subpackets included in the retransmission packet.

25. The data transmission apparatus of claim 24, wherein the transmission duration of the retransmission packet does not exceed a transmission duration of the initial transmission packet.

26. A data transmission method comprising:
determining a retransmission mode for an initial transmission packet which has a transmission error;
generating a retransmission packet, which comprises at least part of the initial transmission packet, according to the determined retransmission mode; and
transmitting the retransmission packet through a communication channel, wherein the determining the retransmission mode comprises selecting the retransmission mode from a plurality of retransmission modes based on a network environment, the plurality of retransmission modes comprising:

a first mode in which the retransmission packet is generated by applying a same coding rate to bits included in the at least part of the initial transmission packet which is comprised of bits coded at the same coding rate and in which the generated retransmission packet is transmitted;

a second mode in which the retransmission packet is generated by applying different coding rates to the bits included in the at least part of the initial transmission packet which is comprised of the bits coded at the same coding rate and in which the generated retransmission packet is transmitted;

a third mode in which the retransmission packet is generated by applying the same coding rate to the bits included in the at least part of the initial transmission packet which is comprised of the bits coded at different coding rates and in which the generated retransmission packet is transmitted; and a fourth mode in which the retransmission packet is generated by applying different coding rates to the bits included in the at least part of the initial transmission packet which is comprised of the bits coded at different coding rates and in which the generated retransmission packet is transmitted.

* * * * *